Feb. 14, 1939.    C. W. VAN RANST    2,146,866
MOTOR VEHICLE
Filed July 21, 1934    2 Sheets-Sheet 1
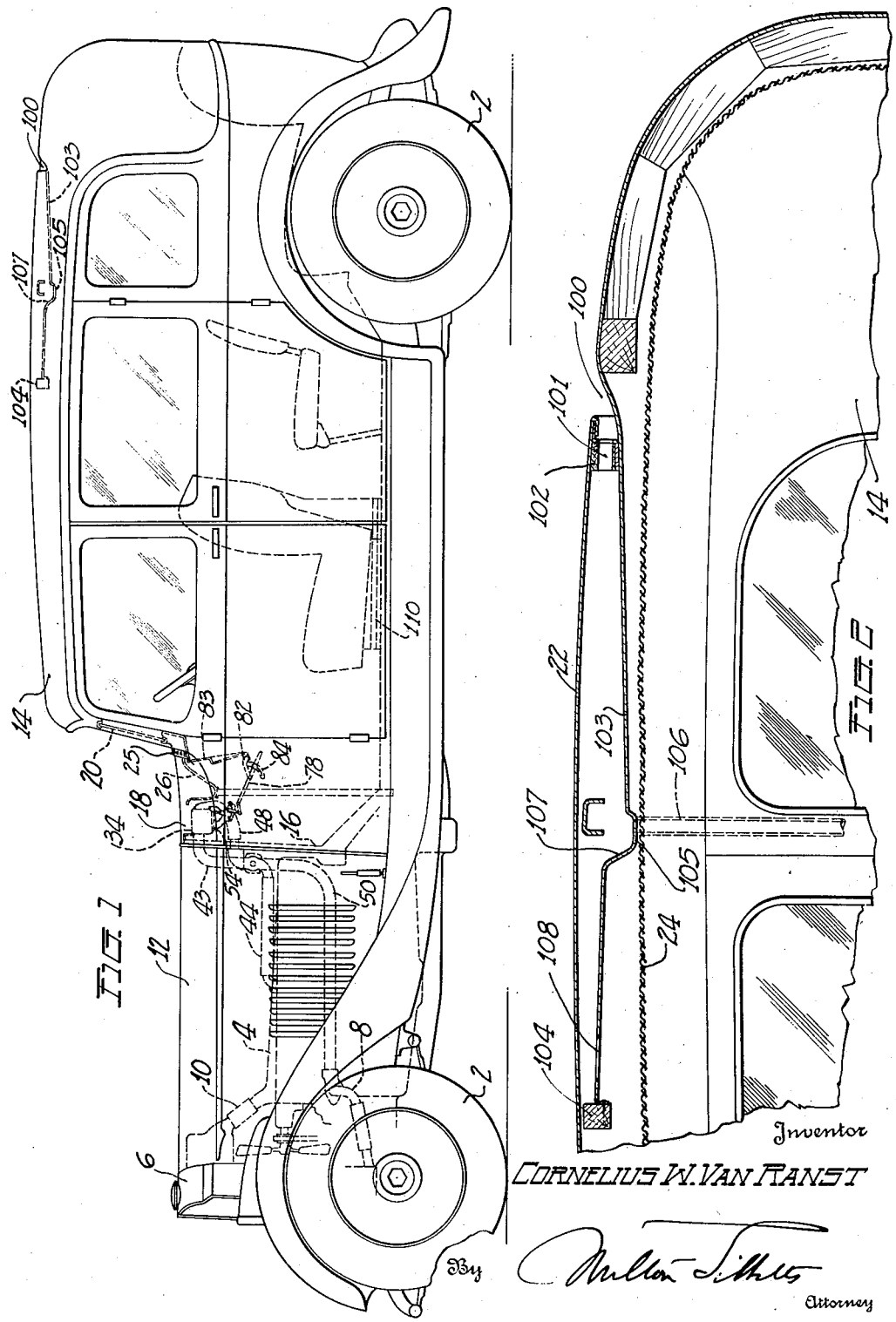
Inventor
CORNELIUS W. VAN RANST
By Milton Tibbetts
Attorney Feb. 14, 1939.  C. W. VAN RANST  2,146,866
MOTOR VEHICLE
Filed July 21, 1934  2 Sheets-Sheet 2
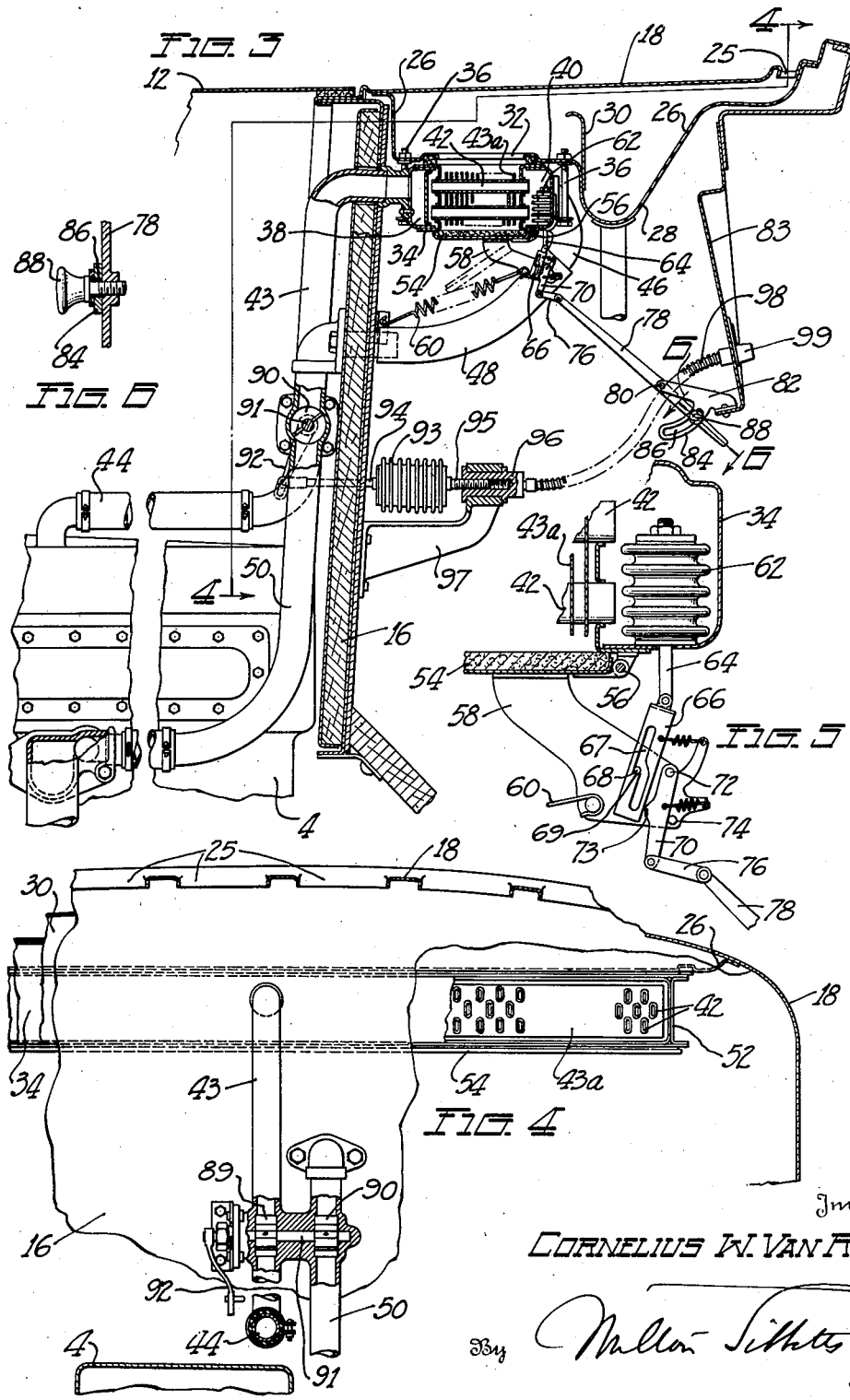
Inventor
CORNELIUS W. VAN RANST
By [signature]
Attorney Patented Feb. 14, 1939

2,146,866

UNITED STATES PATENT OFFICE 2,146,866

MOTOR VEHICLE

Cornelius W. Van Ranst, Detroit, Mich., assignor to Packard Motor Car Company, Detroit, Mich., a corporation of Michigan Application July 21, 1934, Serial No. 736,292

7 Claims. (Cl. 237—12.3)

This invention relates to motor vehicles and more particularly to a construction for heating and ventilating such vehicles.

One object of the invention is to improve the construction and mode of operation of devices for heating and ventilating motor vehicles and to provide a novel and improved construction by which a constant supply of fresh air heated to a comfortable temperature may be supplied to the body of a motor vehicle.

Another object of the invention is to produce a novel and improved construction for motor vehicles which will cause an adequate supply of fresh air to be circulated constantly through the body of a vehicle without the production of drafts.

A still further object of the invention is to improve the construction of heaters for supplying heated air to the bodies of motor vehicles and the arrangement of such heaters with a view of rendering them more efficient in operation and to enable the supply of heat delivered from such a heater to be controlled in accordance with the requirements.

With the above and other objects in view, the invention consists in a construction embodying the novel and improved features hereinafter described and particularly pointed out in the claims, the advantages of which will be readily understood by those skilled in the art.

The invention will be clearly understood from the accompanying drawings illustrating a construction embodying the several features of the invention in their preferred forms and the following detailed description of the constructions therein shown.

In the drawings, Fig. 1 is a view in side elevation illustrating a motor vehicle having a construction embodying the invention applied thereto.

Fig. 2 is a detail view in vertical section taken longitudinally of the vehicle through the roof portion of the body.

Fig. 3 is a detail view partly in side elevation and partly in vertical section taken longitudnally of the body and illustrating particularly the construction for admitting air to the body and for heating the same.

Fig. 4 is a detail sectional view taken substantially on the line 4—4 of Fig. 3;

Fig. 5 is a view partly in side elevation and partly in section illustrating a construction for adjusting one of the parts of the heater mechanism, and;

Fig. 6 is a detail sectional view taken substantially on the line 6—6 of Fig. 3.

The invention is illustrated in this application as applied to a motor vehicle comprising a chassis supported upon wheels indicated at 2, an internal combustion engine 4, a radiator 6 connected with the water jacket of the engine by means of pipe connections 8 and 10, a hood 12 enclosing the engine, a body 14 having a dash 16, a cowl 18, and a windshield 20. The body is provided with a top comprising a roof 22 and having a headlining 24 of porous fabric spaced from the roof.

In order to admit a supply of fresh air to the space within the cowl, the rear porton of the cowl adjacent the windshield is provided with a series of slots 25. Within the cowl and extending forwardly from the slots 25 is an air directing plate 26 recessed to provide a water pan 28 extending transversely of the vehicle. Secured to one wall of the recessed portion of the plate 28 forming the water pan is a plate 30 extending upwardly from the plate 26. The plate 30 deflects the air upwardly toward the wall of the cowl and insures the interception of any drops of water contained in the air and the deflection thereof into the water pan. The forward margin of the plate 26 is extended upwardly and secured to the cowl as shown in Fig. 3. The plate 26 is formed with an elongated opening 32 through which the air flowing over the plate 30 passes downwardly into the heater indicated at 34. The heater is secured to the plate 26 by means of a series of bolts 36.

The heater shown in the drawings has the construction illustrated in Figs. 3 and 4. The heater comprises elongated chambers 38 and 40 connected by flattened tubes indicated at 42 upon which are secured parallel fin plates 43a. The heater is connected with the water jacket of the engine by piping which produces a circulation of hot water through the heater. The chamber 38 at one end of the heater is connected with the water jacket by means of pipes 43 and 44 which deliver hot water to the heater. The hot water after passing through the heater is returned to the engine cooling system by means of the pipes 46, 48 and 50 connected with the chamber 40 and with the piping 8.

The space between the chambers 38 and 40 at the ends of the heater is closed by means of plates 52 forming a passage, the sides of which are the walls of the chambers 38 and 40 and the ends of which are the plates 52. In order to control the flow of air, which enters the opening 32 in the plate 26, through this passage, an air valve or door 54 is pivoted at 56 to the heater and is arranged to swing from the closed position shown in full lines in Fig. 3 to the open position shown in dot-and-dash lines in this figure. This air valve is preferably located in closed position when the heater is cold so as to prevent the flow of air through the heater. When the heater becomes heated up to a predetermined temperature sufficient to heat the air passing therethrough to the required degree, the air valve is opened by automatically acting mechanism to allow the air to flow through the heater. This mechanism preferably is controlled by the temperature of the water in the heater to adjust the valve.

As shown in the drawings, the valve 54 is provided with an arm 58 secured thereto to which is attached a coiled spring 60 for closing the valve. The position of the valve is controlled by means of a thermostat 62 mounted within the chamber 40 so that it is subjected to temperature of the hot water flowing through the heater. The thermostat is of the bellows type and the lower end thereof is secured to the bottom wall of the chamber 40 and the upper end is arranged to act upon a longitudinally movable rod 64 passing through the thermostat. To the lower end of the rod 64 is pivoted a link 66 having a slot 67 in which engages a pin 68 mounted on the arm 58. The slot 67 is shaped as shown clearly in Fig. 5. As shown in this figure, the slot is provided with a ledge 69 intermediate between the ends thereof against which the pin 68 rests when the thermostat 62 is in control of the position of the air valve 54. With the parts in the position shown in this figure, the longitudinal movement of the rod 64 produced by the expansion and contraction of the thermostat will cause the air valve 54 to swing about its axis 56 to open and close the same.

To enable the air valve to be adjusted manually, a lever 70 is pivoted at 72 on the arm 58 and is provided with a projection 73 arranged to engage the link 66. The lever is also arranged to engage a pin 74 secured to the arm 58.

The lever 70 is connected by a link 76 to the upper end of a lever 78 pivoted at 80 on a bracket 82 attached to the instrument board. The bracket is formed with a quadrant 84 having a slot 86 and a holding screw 88 is passed through the said slot and is threaded into the lever 78, the head of the screw engaging frictionally the quadrant.

When the air valve 54 is held in open position by the thermostat 62, and it is desired to close the same, the lever 78 is actuated in a direction to swing the lever 70 to the left, Fig. 5. During this movement, the lever 70 engages the link 66 and swings the link to the left thereby disengaging the ledge 69 from the pin 68. When this occurs, the spring 60 swings the arm 58 to the left, thereby engaging the pin 68 in the portion of the slot 67 below the pin. The movement of the arm continues until the lever 70 engages the pin 74. The air valve then may be gradually closed by the continued movement of the lever 78. When the thermostat has caused the closing of the air valve and it is desired to open the same, the lever 78 is actuated in a direction to swing the lever 70 to the right, Fig. 5. This engages the lever 70 with the pin 74 and the movement thereof swings the arm 58 therewith and opens the air valve, the pin 68 then moving upwardly in the slot 67. The air valve thus may be adjusted in any desired position by the adjustment of the lever 78 and may be secured in adjusted position by the tightening of the screw 88. The screw is normally left loose so that the lever 78 can swing freely during the automatic adjustment of the air valve by the action of the thermostat.

In order to control the temperature of the heater, means is provided for controlling the flow of water from the water jacket of the motor through the heater. To this end a valve 89 is mounted in the pipe 43, and a valve 90 is mounted in the pipe 50 to control the flow of water in these pipes. As shown in Fig. 4, the valves 89 and 90 are mounted upon a common valve stem 91 to one end of which is connected an operating arm 92. The position of the valves is controlled by means of a thermostat 93 to one end of which is secured a longitudinally movable rod 94 having a pin and slot connection with the arm 92. The thermostat is mounted upon a rod 95 threaded into a sleeve 96 rotatably mounted in an arm 97 secured to the dash 16. The sleeve is rotated by means of a flexible shaft 98, one end of which is connected to the sleeve and the other end of which is connected to a rotatable knob 99 mounted on the instrument board 83. By rotating the knob, the thermostat setting can be varied so that the associated valves will be actuated to maintain a desired air temperature in the body.

The thermostat 93 lies in the path of the air currents flowing downwardly through the heater 34. When the temperature of the air from the heater rises, the thermostat expands to adjust the valves 89 and 90 to restrict the passage of water through the pipes 43 and 50 to a degree depending upon the temperature of the air. When the temperature of the air from the heater falls, the thermostat contracts to adjust the valves 89 and 90 to permit a freer flow of the water through the pipes.

The air enters the body under pressure through the slots 25 and is drawn from the body adjacent the rear portion thereof by Venturi action. In this manner an efficient circulation of fresh air through the body is maintained.

The roof is provided with a transverse opening or slot 100 adjacent the rear thereof with which communicates the space between the headlining and the roof forwardly of said slot by means of a series of openings 101 in a cross brace 102 to which the roof is attached. In order to prevent the entrance of water into the body through the slot 100, the construction shown comprises a deflector plate 103 extending forwardly from that part of the roof to the rear of the slot 100, beneath the cross brace and from that point forwardly for a considerable distance between the headlining and the roof. The forward margin of the plate is secured to a cross brace 104. The plate 103 is inclined downwardly from the cross brace 102 and is formed with a depressed portion 105 extending across the body forming a pan from which the water is drained by tubes 106. At the front of the pan is an inclined portion 107 extending upwardly from the pan to prevent water from passing beyond this point. The forward part of the plate is formed with openings 108 through which the air passes from the space below the plate.

During the movement of the body of the vehicle through the air, the air within the body is drawn outwardly through the slot 100 by suction or ejector action. The air from within the body passes upwardly through the headlining substantially throughout the length of the body into the space between the headlining and the roof. Then the air is drawn upwardly through the openings 108 in the plate 103 and passes rearwardly over the plate through the openings 101 and is discharged through the slot 100.

Thus through the pressure of the air in front of the windshield which forces the air into the slots 25 and the ejector action at the slot 100 which draws the air from within the body outwardly through said slot, a constant circulation of air is maintained through the body of the vehicle while the vehicle is in motion. This circulation may be controlled by the adjustment of the air valve 54 either automatically by the thermostat 93 or manually by the adjustment of the lever 78. In order to facilitate the circulation of the air in the body, openings 110 preferably are formed underneath the front seat to connect the space in front of said seat with the space to the rear thereof.

With the above construction a constant supply of fresh air heated to the desired temperature is maintained in circulation through the body of a motor vehicle. When the engine is cold, the air valve 54 is closed, preventing the passage of cold air into the body of the vehicle. This also causes the heater to heat up more quickly. After the heater has been heated to the proper temperature the air valve is automatically opened by the action of the thermostat 62. In hot weather when the temperature of the outside air is relatively high and it is desired to maintain a circulation of fresh air through the motor vehicle without heating the same, the thermostat 93 will operate to cut off the circulation of water from the engine through the heater. Whenever the temperature of the air circulating through the cowl falls below a predetermined temperature, the thermostat 93 will operate to start the circulation of water through the heater. The temperatures at which the circulation of water through the heater will be cut off and started by the thermostat respectively to throw the heater out of and into operation may be varied by adjusting the thermostat. The thermostats 62 and 93 tend to maintain the air passing through the heater at a substantially uniform temperature.

It is to be understood that the invention is not limited to the particular construction and arrangement of parts of the illustrated embodiment of the invention, but that the construction shown and described is merely illustrative of the invention and that the invention may be embodied in other forms within the scope of the claims.

Having explained the nature and object of the invention and having specifically described a construction embodying the invention in its preferred form, what is claimed is:

1. A construction for ventilating and heating motor vehicles comprising a body having means for admitting air, a heater in the path of the air currents entering the body through said means, a self closing valve device for controlling the flow of said air past the heater in heat exchange relation therewith, thermostatic means for opening said device above a predetermined heater temperature, and means for adjusting said device manually, independently of said thermostatic means.

2. A construction for heating a motor vehicle body comprising passage forming means leading from the exterior to the interior of the body, a heater in said passage means heated by the vehicle motor, a valve in said passage forming means controlling the entire flow of air from said passage forming means into said body, means normally urging said valve into position closing said passage means, and a thermostat in said passage forming means connected to open said valve, said thermostat being effected to open said valve in response to a predetermined heater temperature.

3. A construction for heating a motor vehicle body comprising passage forming means leading from the exterior to the interior of the body, a heater in said passage means heated by the motor, a valve associated with the outlet end of said passage means for controlling the entire flow of air therethrough, means normally holding said valve in a position closing said passage means outlet, and automatically operated means in said passage forming means for moving said valve to open position relative to the passage means outlet and for holding the same in open position when the heater temperature is above a predetermined degree.

4. A construction for heating a motor vehicle body comprising air passage means leading from the exterior to the interior of said body, a heater in said passage means, thermostatic means for regulating the temperature of the heater, and thermostatic means for controlling the flow of air through said passage means, said thermostatic means for controlling the heater temperature being responsive to temperature within the body and the thermostatic means for controlling air flow being responsive to the heater temperature.

5. In a heating system for motor vehicle bodies, the combination of conduit means through which air passes into the body, a heater in the conduit, a valve controlling the entire passage of air through the conduit means, spring means normally urging the valve into position to stop the flow of air through the conduit means, and a thermostat in said conduit means connected to move said valve into open position, said thermostat being actuated to open said valve in response to a predetermined heater temperature.

6. In a heating system for motor vehicle bodies, the combination of conduit means through which air passes into the body, a heater in the conduit, a valve controlling the passage of air through the conduit means, an arm on said valve, spring means connected to said arm in a relation normally urging the valve into position closing the conduit, a thermostat, means connecting said thermostat with said arm, said thermostat being responsive to a predetermined temperature in said heater to actuate said connecting means to open said valve, and manually operable means connected with said arm for actuating said valve independently of said thermostat.

7. A construction for heating motor vehicles comprising a heater, means for directing currents of air past the heater in heat exchange relationship, a normally closed means for controlling the passage of air currents from the heater to the body of a motor vehicle, a thermostat responsive to increases in temperature of said heater for controlling said normally closed means to open said passageway when a predetermined temperature is reached in said heater, and means for disconnecting the thermostat and adjusting said normally closed means manually.

CORNELIUS W. VAN RANST.